June 26, 1956 J. R. HALL 2,752,570

SINGLE SIDEBAND GENERATOR

Filed Feb. 26, 1953 4 Sheets-Sheet 1

INVENTOR.
JAMES R. HALL

BY D. A. Reckif
AGENT

INVENTOR.
JAMES R. HALL
BY F. A. Reckif
AGENT

SINGLE SIDEBAND GENERATOR

Filed Feb. 26, 1953 4 Sheets-Sheet 3

INVENTOR.
JAMES R. HALL
BY F. A. Reckif
AGENT

INVENTOR.
JAMES R. HALL
BY [signature]
AGENT

United States Patent Office 2,752,570

Patented June 26, 1956

2,752,570

SINGLE SIDEBAND GENERATOR

James R. Hall, Haddonfield, N. J., assignor to Radio Corporation of America, a corporation of Delaware Application February 26, 1953, Serial No. 339,150

17 Claims. (Cl. 332—45)

This invention relates to transmitters, and more particularly to a system for generating a single sideband wave.

The system of this invention is a single sideband generator of the phase rotation type, in which, by proper phasing of the modulating and carrier waves fed to the several modulators and by proper combination of the outputs of these modulators, the system output may be made to be a single sideband. Conventional single sideband generators of the phase rotation type rely, in general, on the accuracy of two 90° phase shift networks to achieve suppression of the undesired sideband. One of these networks must supply two outputs of equal amplitude and 90° phase difference over the desired audio or other modulation frequency passband, and the other network in the radio frequency (R. F.) or carrier circuit has to supply two outputs of equal amplitude and exactly 90° phase difference at a single frequency (the carrier frequency). However, the characteristics of this latter phase shifting network, operating at R. F., are rather critical, in that exact 90° phase difference must be maintained in order to ensure the desired amount of sideband suppression. Thus, when the operating frequency is changed, the R. F. phase shift network must of necessity be readjusted to reach the exact 90° phase difference point and thereby maintain a constant amount of sideband suppression.

R. F. phase shift networks of this type, which are capable of the required precise adjustment over a sufficient frequency range, are very difficult, if not impossible, to design and are also very complicated and expensive. Moreover, it is extremely difficult to measure phase shifts at radio frequencies with testing or measuring equipment ordinarily available, so that it is next to impossible to ascertain the existence of a condition of 90° phase difference between the two R. F. or carrier outputs; as previously stated, this 90° phase difference condition must be exactly maintained to suppress the undesired sideband to the required degree, when using single sideband generators of the prior art.

An object of this invention is to devise a single sideband generator of the phase rotation type which does not require the use of a complicated and expensive 90° R. F. phase shift network.

Another object is to devise a single sideband generator of the phase rotation type in which the phase shift of of the R. F. phase shift network may vary from 90° without loss of the ability to suppress the undesired sideband to the extent desired.

A further object is to devise a single sideband generator of the phase rotation type which renders unnecessary the measurement of any phase shifts or phase differences at R. F.

A still further object is to provide a novel single sideband generator in which the particular one of the two sidebands selected for utilization may be readily changed from the upper sideband to the lower sideband, and vice versa.

The objects of this invention are accomplished, briefly, in the following manner: Four modulators are utilized, the outputs of two of these being added together to form a first "paired" output and the outputs of the other two being added together to form a second "paired" output. Carrier energy of R. F. and of zero phase is applied to one modulator of each of the two pairs, and carrier energy of the same frequency but shifted in phase (e. g., shifted about 90° in phase with respect to said zero phase) is applied to the other modulator of each of the two pairs. Audio frequency or modulating energy of a certain phase is passed through a phase inverter circuit to derive a push-pull, double-ended or antiphasal output the two ends of which are applied to the two respective modulators of the first pair of modulators. The modulating energy is shifted in phase 90° with respect to the said certain phase and applied through a variable gain amplifier to the two modulators of the second pair. The first and second "paired" outputs are then combined subtractively to produce a single side band suppressed carrier signal. In a modification, the outputs of one of the pairs of modulators are combined subtractively, and the outputs of the other pair of modulators are also combined subtractively. In this case, the first and second "paired" outputs are combined additively to provide a single side band, suppressed-carrier signal.

The above as well as other objects of the invention will be best understood from the following description of some exemplifications thereof, reference being had to the accompanying drawings, wherein.

Figure 1:
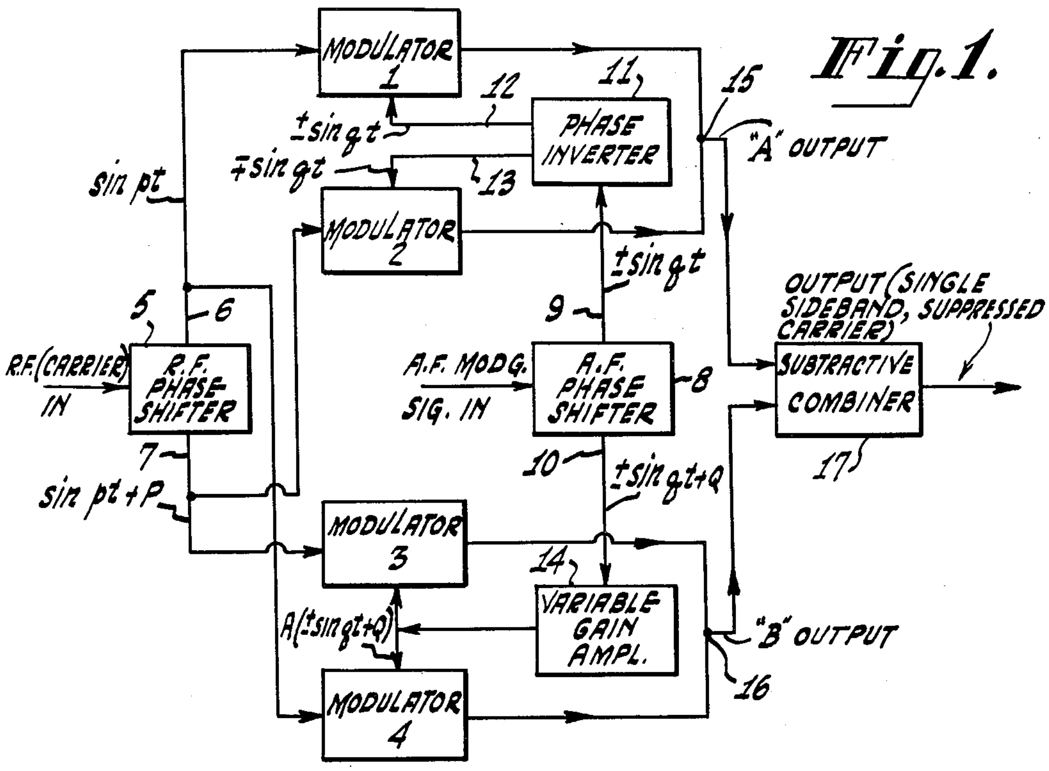
Fig. 1 is a block diagram of a single sideband generating system according to this invention.

Referring first to Fig. 1, the system of this invention includes four linear amplitude modulators denoted by numerals 1, 2, 3 and 4, respectively. The inputs and outputs of these modulators are connected in pairs. More particularly, a suitable source of R. F. or carrier frequency, for example an oscillator, supplies input to an R. F. phase shifter 5 which splits the input into two outputs which are equal in amplitude and have a phase difference between zero and 180°, preferably near 90°, for maximum efficiency of the system, but not necessarily exactly 90°. One of these outputs appears at output lead 6 and may be taken to have zero phase or reference phase. It may therefore be denoted by the expression sin $pt$, as indicated in Fig. 1, and may be considered as a first R. F. driving source which drives modulators 1 and 4, since lead 6 is connected to modulators 1 and 4 to supply input thereto. The second of the two outputs from phase shifter 5 appears at output lead 7 and may be denoted by the expression sin $pt \pm P$, having ing a phase displacement of P with respect to the output at lead 6. The second output (at lead 7) is a second R. F. driving source which drives modulators 2 and 3, since lead 7 is connected to modulators 2 and 3 to supply input thereto. Thus, it may be seen that the R. F. inputs of modulators 1 and 4 are connected as one pair, while the R. F. inputs of modulators 2 and 3 are connected as another pair. Details of typical circuitry for phase shifter 5 will be provided hereinafter.

The audio or other modulating signal is split into two paths having a phase difference of 90° by means of an audio frequency phase shifter 8, which is a wide band phase splitting or phase shifting network of any of several known types, such as the type to be described hereinafter. Thus, the phase shifter 8 provides two-phase audio signals at its outputs, one phase (which may be considered to be the reference phase and which may be denoted by $\pm\sin qt$) appearing at output lead 9 and the other phase (which may be denoted by $\pm\sin qt+Q$, where Q is 90°) appearing at output lead 10. The two outputs coming from phase shifter 8 should have a constant amplitude ratio (e. g., 1:1 or 2:1 or 1:2) for proper operation of the system.

The output lead 9 is connected to a phase inverter 11, to supply thereto as input the audio voltage $\pm\sin qt$. The phase inverter is of any well-known type which operates as a phase splitter, to derive a pair of antiphasal, out-of-phase or push-pull voltages from a single input voltage, and this phase inverter preferably has a gain of unity, that is, it provides no actual increase of signal strength. One of the two voltages out of phase inverter 11 appears at output lead 12 and has the same phase as the input to inverter 11; this output voltage may be denoted by the expression $\pm\sin qt$, the same as that used for the voltage on lead 9. Output lead 12 is coupled to modulator 1 to supply thereto, as modulating signal input, the voltage $\pm\sin qt$. The other (that is, the antiphasal) voltage out of phase inverter 11 appears at output lead 13 and is opposite in phase with respect to the input to inverter 11; this output voltage may therefore be denoted by the expression $\mp\sin qt$. Output lead 13 is coupled to modulator 2 to supply thereto, as modulating signal input, the voltage $\mp\sin qt$. In this way, the audio modulating signals supplied to modulators 1 and 2 are equal in amplitude and opposite in phase.

The output lead 10 of phase shifter 8 is connected to a variable gain amplifier 14, to apply the voltage $\pm\sin qt+Q$ (where $Q=90°$) as input to this amplifier. The amplifier 14 has an amplification factor of A. The output of amplifier 14, a voltage denoted by the expression $A(\pm\sin qt+Q)$, or $A(\pm\sin qt+90°)$, is applied in parallel as the modulating input to modulators 3 and 4. It will be noted that the modulating voltage input to modulators 3 and 4 is in phase quadrature with, or at a relative phase of 90°, with respect to the modulating voltages fed to modulators 1 and 2. Of course, the modulating voltage fed to modulators 3 and 4 leads either the modulating voltage fed to modulator 1 or that fed to modulator 2 by 90°, and lags the other by 90°, depending upon the particular connections.

The outputs of the four linear amplitude modulators 1, 2, 3 and 4 (which may be of any suitable type, such as control grid modulators, cathode modulators, suppressor grid modulators, or screen grid modulators, or simple diode modulators) are connected in pairs. More particularly, the outputs of modulators 1 and 2 are additively combined or added together at point 15 to form the "A" output, while the outputs of modulators 3 and 4 are additively combined or added together at point 16 to form the "B" output. In this way, the outputs of modulators 1 and 2 are connected to form a first pair, and the outputs of modulators 3 and 4 are connected to form a second pair.

The "A" output and the "B" output are combined subtractively in a subtractive combiner 17 (e. g., a push-pull tank circuit) to provide the output of the system, which is a single sideband, suppressed carrier signal.

The operation of this invention will now be explained, with reference first to the vector diagrams of Figs. 2–14. These diagrams are for the usual (and preferred) case, where $P=90°$, Q being 90° for all cases. This case corresponds, then, to the conditions obtaining in the prior art, conventional, phase rotation single sideband generator, wherein the difference in phase of the R. F. signals supplied to the two balanced modulators of the conventional generator must be 90°. It will be understood, by those skilled in the art, that the conventional phase rotation type of single sideband generator ordinarily includes two balanced modulators.

Figures 2, 3, 4, 5, 6, 7, 8, 9, 10, 11:
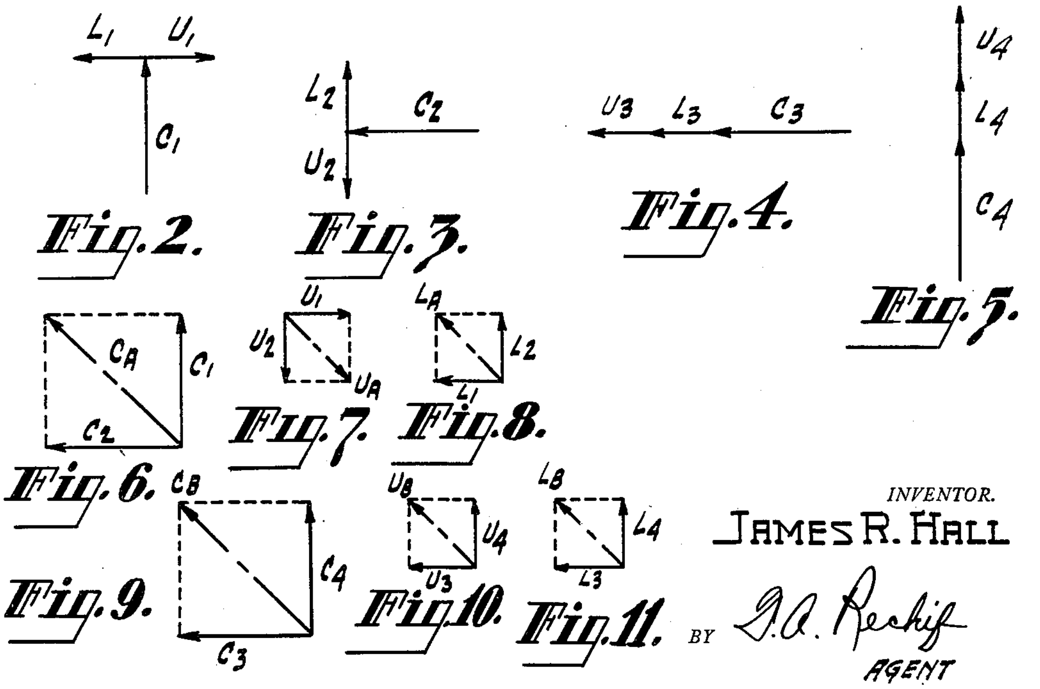
Figs. 2–27 are vector diagrams useful in explaining the operation of Fig. 1.

In Figs. 2–14, the carrier vectors are labeled "C" and upper and lower sideband vectors are labeled "U" and "L," respectively. It is also assumed, for these figures, that the percentage modulation, *m*, is the same for all of modulators 1–4. Fig. 2 represents the output of modulator 1. Fig. 3 represents the output of modulator 2. It will be noted that the carrier vector $C_2$ in Fig. 3 is at 90° with respect to the carrier vector $C_1$ in Fig. 2, since the R. F. or carrier input to modulator 2 is at a phase angle $P=90°$ with respect to the carrier input to modulator 1. In this connection, it is desired to be pointed out that the vector diagrams of Figs. 2–5 are all drawn in such a manner that the several "U" and "L" vectors are properly positioned with respect to the respective "C" vector in the same figure. In other words, if each of Figs. 3–5 is rotated bodily until its "C" vector is in the same direction as that of Fig. 2, then the "L" and "U" vectors of Figs. 3–5 may be directly compared as to phase with those of Fig. 2. When this (which is a convention in the art of carrier and sideband vectors) is kept in mind, it may be realized that the vectors $U_2$ and $L_2$ of Fig. 3 are actually at 180° with respect to the corresponding vectors $U_1$ and $L_1$ of Fig. 2, which corresponds to the fact that the audio modulating voltages supplied to modulators 1 and 2 are 180° out of phase with each other.

Fig. 4 represents the output of modulator 3. The vector $C_3$ is at 90° with respect to vector $C_1$, since the R. F. input to modulator 3 is at a phase angle of 90° with respect to the R. F. input to modulator 1. The vectors $U_3$ and $L_3$ of Fig. 4 are actually at 90° or in space quadrature with respect to the corresponding vectors $U_1$ and $L_1$ of Fig. 2, which corresponds to the fact that the audio modulating voltage supplied to modulator 3 is 90° out of phase with that supplied to modulator 1. It should be realized that, according to conventional representation, the upper sideband vector is rotating counterclockwise and the lower sideband vector, clockwise.

Fig. 5 represents the output of modulator 4. The vector $C_4$ is in phase with vector $C_1$ of Fig. 2, since the R. F. inputs to modulators 1 and 4 are in phase. The vectors $U_4$ and $L_4$ of Fig. 5 are again at 90° with respect to the corresponding vectors $U_1$ and $L_1$ of Fig. 2, since the audio modulating voltage supplied to modulator 4 is also 90° out of phase with that supplied to modulator 1.

Figs. 6–8 represent the vectorial addition of the outputs of modulators 1 and 2 (Figs. 2 and 3) at point 15 to provide the "A" output. Fig. 6 represents the addition of vectors $C_1$ and $C_2$ to provide the resultant carrier output $C_A$. Fig. 7 represents the addition of vectors $U_1$ and $U_2$ to provide the resultant upper sideband output $U_A$. Fig. 8 represents the addition of vectors $L_1$ and $L_2$ to provide the resultant lower sideband output $L_A$.

Figs. 9–11 represent the vectorial addition of the outputs of modulators 3 and 4 (Figs. 4 and 5) at point 16 to provide the "B" output. Fig. 9 represents the addition of vectors $C_3$ and $C_4$ to provide the resultant carrier output $C_B$. Fig. 10 represents the addition of vectors $U_3$ and $U_4$ to provide the resultant upper sideband output $U_B$, while Fig. 11 represents the addition of vectors $L_3$ and $L_4$ to provide the resultant lower sideband output $L_B$.

Figures 12, 13, 14, 15, 16, 17, 18, 19, 20, 21, 22, 23, 24, 25, 26, 27:
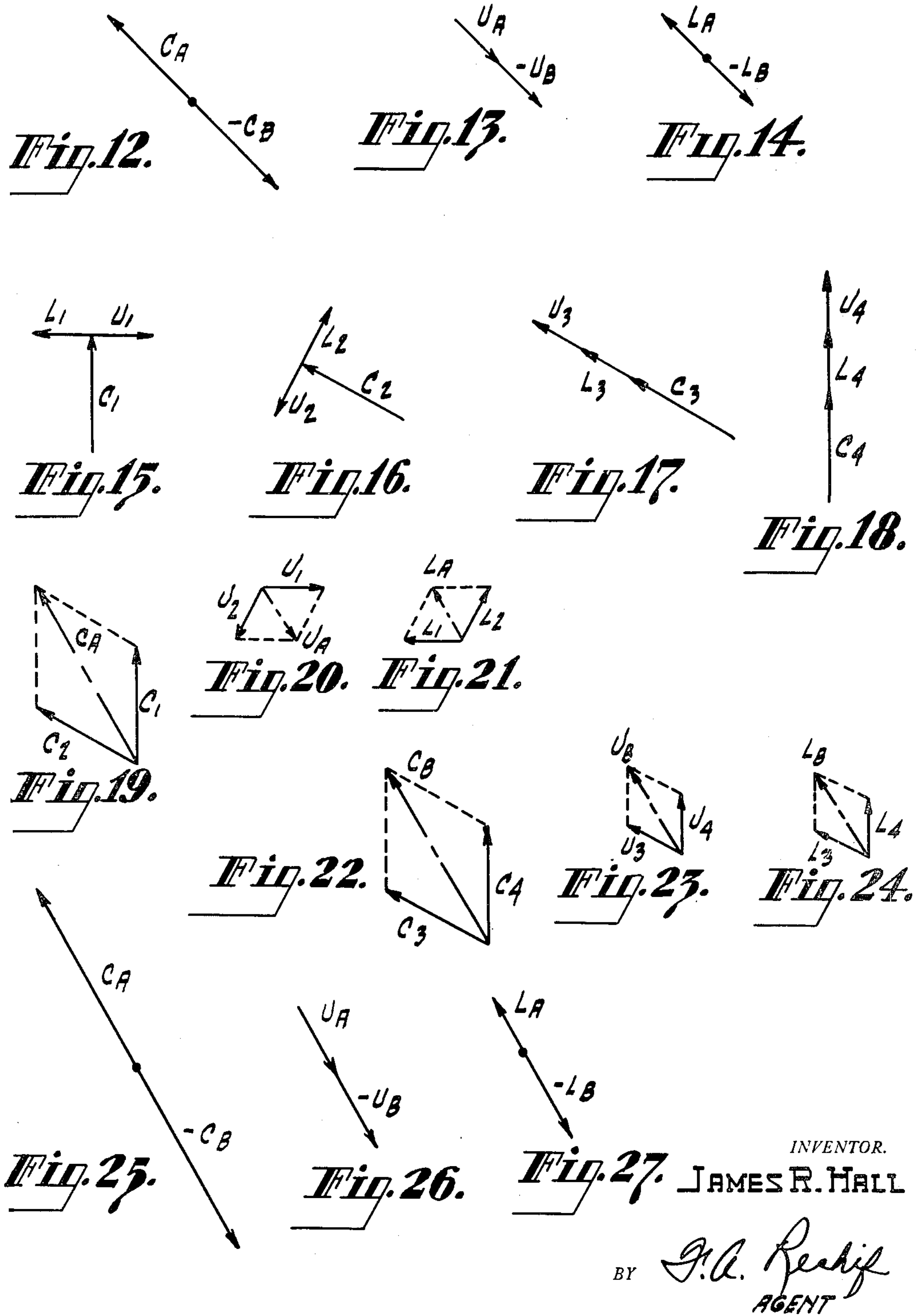

Figs. 12–14 represent the subtractive combination, $E_A-E_B$, of the "A" and "B" output, in subtractive combiner 17. Fig. 12 represents the subtractive combination, $C_A-C_B$, of the carriers $C_A$ and $C_B$ applied to combiner 17. It may be seen that the two carrier vectors $C_A$ and $-C_B$ are equal and opposite, so that the carrier is cancelled out or suppressed at the output of combiner 17. Fig. 13 represents the subtractive combination, $U_A-U_B$, of the upper sideband vectors $U_A$ and $U_B$ applied to combiner 17. It may be seen that the upper sideband is reinforced and appears at the output of combiner 17, since vectors $U_A$ and $-U_B$ extend in the same direction. Fig. 14 represents the subtractive combination $L_A-L_B$, of the lower sideband vectors $L_A$ and $L_B$ applied to combiner 17. It may be seen that the two lower sideband vectors $L_A$ and $-L_B$ are equal and opposite, so that the lower sideband is cancelled out or suppressed at the output of combiner 17. Thus, for the particular connections in Fig. 1 and the phase relations represented in Figs. 2–5, the carrier and lower sideband are cancelled at the output of combiner 17 (the system output), while the upper sideband is reinforced and transmitted. The degree of cancellation is dependent on the relative levels of R. F. energy and modulating energy into the several modulators. Since these levels are assumed to be equal for this set of conditions (all of the *m's* being equal), perfect cancellation of the undesired sideband results.

If the "A" output and the "B" output are combined additively, rather than subtractively as described, a somewhat different action takes place. In this case, the directions of the vectors $C_B$, $U_B$ and $L_B$ in Figs. 12–14 would all be reversed. Then, the carrier would not be cancelled at the system output, but instead would appear thereat in augmented fashion. The upper sideband would be cancelled at the system output, while the lower sideband would appear thereat in augmented form. Thus, the carrier and the lower sideband would be transmitted, while the upper sideband would be cancelled or suppressed. However, in single sideband communication work it is ordinarily considered undesirable to transmit the carrier, so that the assumed additive combination of the "A" and "B" outputs is disadvantageous and the subtractive combination of these outputs (as in Figs. 12–14, by means of which the carrier is suppressed) is preferred, insofar as the arrangement of Fig. 1 is concerned.

Another condition will now be assumed, with reference to the vector diagrams of Figs. 15–27. These diagrams are for an R. F. phase difference (between the two R. F. driving sources at leads 6 and 7) of 60°. That is $P=60°$, and again $Q=90°$. Again, the *m*'s of modulators 1–4 are all assumed to be equal. Fig. 15 represents the output of modulator 1. This is the same as in Fig. 2. Fig. 16 represents the output of modulator 2. Here the carrier vector $C_2$ is at an angle of 60° with respect to carrier vector $C_1$ in Fig. 15, to correspond to the assumed 60° R. F. phase difference into modulators 1 and 2. Fig. 17 represents the output of modulator 3, the carrier vector $C_3$ in this figure lying in the same direction as vector $C_2$ in Fig. 16, since modulators 2 and 3 are excited by the same R. F. driving source. Fig. 18 represents the output of modulator 4. This is the same as in Fig. 5. In Figs. 15–18, the "U" and "L" vectors have the same angle with respect to their respective carrier vectors as in Figs. 2–5, since in the two cases the phases of the audio frequency modulating voltages are the same.

Figs. 19–21 represent the vectorial addition of the outputs of modulators 1 and 2 (Figs. 15 and 16) to provide the "A" output. Fig. 19 represents the addition of vectors $C_1$ and $C_2$ to provide the resultant carrier output $C_A$. Fig. 20 represents the addition of vectors $U_1$ and $U_2$ to provide the resultant upper sideband output $U_A$. Fig. 21 represents the addition of vectors $L_1$ and $L_2$ to provide the resultant lower sideband output $L_A$.

Figs. 22–24 represent the vectorial addition of the outputs of modulators 3 and 4 (Figs. 17 and 18) to provide the "B" output. Fig. 2 represents the addition of vectors $C_3$ and $C_4$ to provide the resultant carrier output $C_B$. Fig. 23 represents the addition of vectors $U_3$ and $U_4$ to provide the resultant upper sideband output $U_B$, while Fig. 24 represents the addition of vectors $L_3$ and $L_4$ to provide the resultant lower sideband $L_B$.

Figs. 25–27 represent the subtractive combination, $E_A-E_B$, of the "A" and "B" outputs, in subtractive combiner 17. Fig. 25 represents the subtractive combination, $C_A-C_B$, of the carriers $C_A$ and $C_B$ applied to combiner 17. It may be seen that the two carrier vectors $C_A$ and $-C_B$ are equal and opposite, so that the carrier is cancelled out or suppressed at the output of combiner 17. Fig. 26 represents the subtractive combination, $U_A-U_B$, of the upper sideband vectors $U_A$ and $U_B$ applied to combiner 17. It may be seen that the upper sideband is reinforced or augmented and appears at the output of combiner 17. Fig. 27 represents the subtractive combination, $L_A-L_B$, of the lower sideband vectors $L_A$ and $L_B$ applied to combiner 17. It may be seen that the two lower sideband vectors $L_A$ and $-L_B$ are opposite but are not equal if the modulation percentages $m_A=m_1=m_2$ of channel A and $m_B=m_3=m_4$ of channel B are equal to each other, as has been assumed to be the case for Figs. 15–27, as well as for Figs. 2–14. Therefore, under these particular conditions ($m_A=m_B$), perfect cancellation of the lower sideband does not result.

However—and this is an important feature of the present invention—a variation from the value of 90° for the R. F. phase difference does not result in a loss of ability to suppress the undesired sideband to the requisite extent. A mathematical analysis of the Fig. 1 system discloses that, for any value of P, the values of $m_A$ and $m_B$ (which are the respective modulation percentages of channels A and B) may be adjusted to obtain full suppression of the undesired sideband. For such full suppression, it is only necessary that $$\frac{m_B}{m_A}=\tan\frac{P}{2} \qquad (1)$$

The particular conditions set forth in Equation 1 may be easily reached by proper adjustment of variable gain amplifier 14, which is so constructed and arranged that the audio modulating signal level into modulators 3 and 4 may be varied to be equal to, greater than, or less than, the modulating signal level into modulators 1 and 2. For values of P (the R. F. phase difference) between ±90° and 0° (e. g., for the value of 60° assumed for Figs. 15–27), the modulating signal level into modulators 3 and 4 is adjusted to be less than that into modulators 1 and 2 (see the foregoing equation, wherein for P less than 90°, $m_B$ is less than unity times $m_A$). Then, the magnitude of $-L_B$ in Fig. 27 will be less than illustrated and can be equal to that of $L_A$, so that complete cancellation of the lower sideband will result. Thus, by a simple and easy adjustment of variable gain amplifier 14, complete cancellation of the undesired sideband may be brought about, even though the R. F. phase difference P is quite different from 90°. In other words, to obtain complete suppression of the undesired sideband, one merely has to change the modulation percentage of one pair of modulators (e. g., modulators 3 and 4).

For values of P between ±90° and ±180°, the modulating signal level into modulators 3 and 4 is adjusted to be greater than that into modulators 1 and 2, for complete cancellation of the undesired sideband (see the foregoing equation, wherein for P more than 90°, $m_B$ is more than unity times $m_A$). Again, the adjustment of the modulating signal level into modulators 3 and 4 may be made by means of amplifier 14. When P is exactly 90°, the modulating signal level into modulators 3 and 4 should be equal to that into modulators 1 and 2, as previously stated (again see the foregoing equation, wherein for P equal to 90°, $m_B$ is equal to $m_A$). In short, whatever the value of P (within reasonable limits) the desired cancellation of the undesired sideband may be brought about by either increasing or decreasing the ratio of the audio signal levels into the pairs of modulators.

The adjustment technique for a change in the value of P could be to monitor the suppressed sideband with a signal level indicating device and vary the signal level of audio channel B (modulators 3 and 4) to obtain a minmum output signal.

The amplitude of the transmitted sideband in the prior art phase rotation system is equal to the sum of the two in-phase outputs of the two balanced modulator channels. In the system of this invention, the transmitted sideband amplitude is $m_B \cos P/2+m_A \sin P/2$, or for $P=90°$ and $m_A$ and $m_B$ adjusted for maximum suppression of the undesired sideband (i. e., with $m_A$ and $m_B$ both equal and of a maximum value), the transmitted signal amplitude is $\cos 90°/2+\sin 90°/2=1.414$. This is a reduction of only 3 db in the maximum output as compared to the conventional system (that is, 1.414 as compared to 2), and correspondingly means that the maximum obtainable ratio of sideband suppression is reduced by only 3 db when all other factors are optimum.

It is interesting to note that for a ±30° variation of P from 90°, the maximum transmitted signal amplitude can be computed in the following manner. If $P=60°$, $P/2=30°$. From Equation 1, $m_B/m_A=\tan 30°=.5774$. If $m_A$ is a maximum at 1 then $m_B=.5774$, resulting in an amplitude (from the expression for the transmitted sideband amplitude, previously given) of $$(.5774)(.8660)+(1)(.5)=1$$

This is a reduction from the maximum output of 3 db (1 as compared to 1.414), and correspondingly a 3 db reduction in the maximum obtainable sideband suppression ratio. However, a similar variation of 30° in the R. F. phase difference of the conventional phase rotation single sideband generator would result in a maximum obtainable sideband suppression (the actual sideband suppression of undesired sideband below desired sideband) of approximately only 12 db, which is far below a usable value.

Since the amplitude of the transmitted sideband follows a curve of $A=2 \sin P/2$, for values of P between 0° and 90°, and $A=2 \cos P/2$, for values of P between 90° and 180°, it is desirable to operate at a nominal value of P equal to 90°. In other words, the optimum operating value for P is in the vicinity of 90°, since greatest efficiency occurs at this point, the point of maximum transmitted sideband amplitude. In practice, this would mean that the R. F. phase shifter 1 would be adjusted to provide a phase difference (between the voltages on leads 6 and 7) of 90° in the center of the desired operating range, and the maximum range would be limited to the point where the phase difference varies about ±30° from the nominal 90° value.

It is clear that, if desired, the variable gain amplifier 14 can be inserted into the modulating signal input path of modulators 1 and 2, rather than into that of modulators 3 and 4, as described.

Selection of the sideband to be transmitted may be accomplished in some instances by reversing the output leads 9 and 10 of the audio frequency phase shifter 8, so that the opposite pair of modulators (i. e., modulators 1 and 2) receives the signal delayed by 90°. Thus, in the system as illustrated and described, the upper sideband is transmitted. If it is desired to transmit the lower sideband, variable gain amplifier 14 would be fed by phase shifter output lead 9 and phase inverter 11 would be fed by phase shifter output lead 10. Once the variable gain amplifier 14 has been adjusted for proper sideband suppression, this suppression will be maintained if the output leads 9 and 10 of the audio frequency phase shifter 8 are simply reversed, provided the two outputs of shifter 8 are equal in amplitude. However, this condition (the outputs of shifter 8 being equal in amplitude) is not absolutely necessary, particularly since the variable gain amplifier 14 may change the effective audio signal level on modulators 3 and 4 during operation, that is, when the R. F. carrier frequency (and therefore the effective phase shift of phase shifter 5) is changed. For this reason, it has been stated hereinbefore that the two outputs from phase shifter 8 should "have a constant amplitude ratio." In case this amplitude ratio is other than 1:1, selection of the sideband desired to be transmitted can no longer be accomplished by simply reversing the output leads 9 and 10 of the audio frequency phase shifter 8. However, such selection can be easily accomplished by reversing the signals into modulators 1 and 2, in a manner to be described hereinafter.

Figure 28:
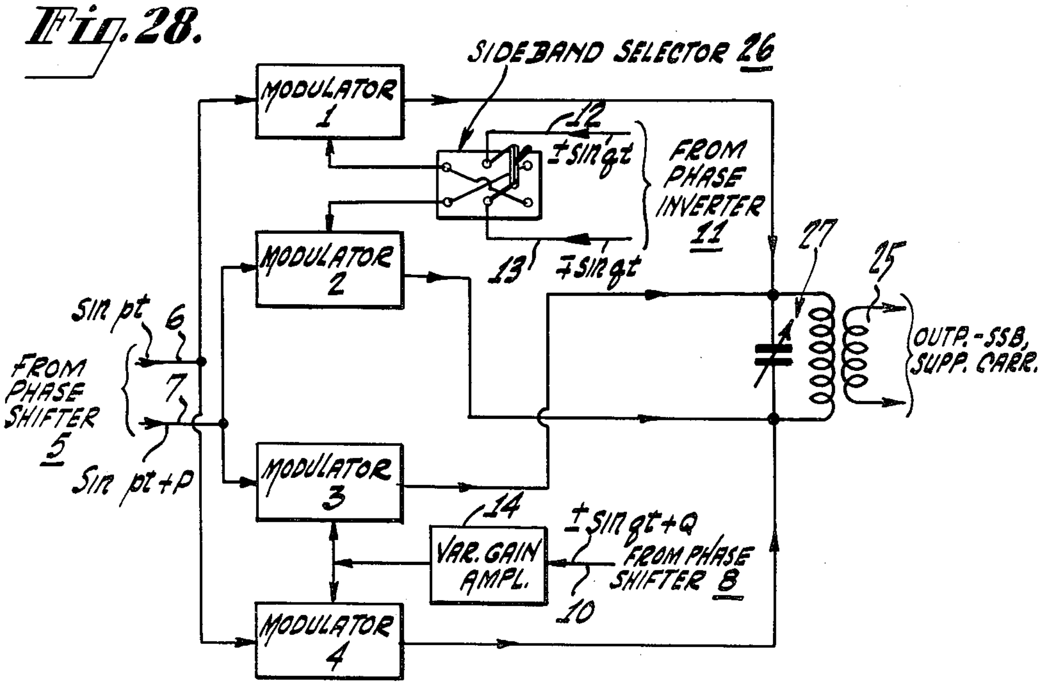
Fig. 28 is a combined block and schematic diagram of a modification of Fig. 1.

Fig. 28 is a hybrid circuit and block diagram of a modification of Fig. 1. In Fig. 28, parts the same as those of Fig. 1 are denoted by the same reference numerals, insofar as possible. In Fig. 28, lead 6 feeds R. F. energy ($\sin pt$) into modulators 1 and 4, just as in Fig. 1, while lead 7 feeds phase-displaced R. F. energy ($\sin pt+P$) into modulators 2 and 3. The modulating energy input connections to the modulators in Fig. 28 are substantially the same as in Fig. 1. By means of a sideband selector 26, which is illustrated as simply a reversing switch, the audio voltages appearing on leads 12 and 13 may be applied as inputs to the respective modulators 1 and 2. That is to say, in one position of selector switch 26, the voltage on lead 12 (which is $\pm\sin qt$) is applied to modulator 1 while the voltage on lead 13 (which is $\mp\sin qt$) is applied to modulator 2; in the other position of selector switch 26, the voltage on lead 12 is applied to modulator 2 while the voltage on lead 13 is applied to modulator 1. Of course, the said "one" position of selector switch 26 corresponds exactly to the connections illustrated in Fig. 1. Lead 10 feeds the audio energy ($\pm\sin qt+Q$), where $Q=90°$, from phase shifter 8 through variable gain amplifier 14, to both of the modulators 3 and 4, in parallel.

In Fig. 28, by means of the combiner 27, the outputs of modulators 1 and 2 are combined subtractively to form the "A" output, while the outputs of modulators 3 and 4 are combined subtractively to form the "B" output. The "A" and "B" outputs are additively combined to form the overall or system output. These respective combinations are effected by means of the push-pull tank circuit 27, to one end of which the outputs of modulators 1 and 3 are applied and to the other end of which the outputs of modulators 2 and 4 are applied. This provides the required combination of $(e_1-e_2)+(e_3-e_4)$, where the $e$'s represent the output voltages of the respective modulators 1, 2, 3, and 4. By means of a winding 25 inductively coupled to the coil of tank circuit 27, the single-sideband, suppressed-carrier output of the Fig. 28 system is abstracted for utilization.

Figs. 29–41 are vector diagrams illustrating the operation of the Fig. 28 system, for the case where $P=90°$ and where the selector switch 26 has such a position that lead 12 is connected to modulator 1 and lead 13 to modulator 2. Figs. 29–32 represent the outputs of modulators 1, 2, 3 and 4, respectively. Since the R. F. and modulating inputs to these modulators are exactly the same as in Fig. 1, Figs. 29–32 are exact duplicates of Figs. 2–5, respectively.

Figure 33:
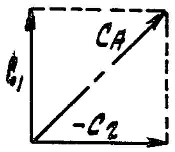
Figure 34:
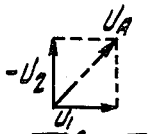
Figure 35:
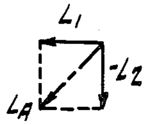

Figs. 33–35 represent the subtractive combination of the outputs of modulators 1 and 2 (Figs. 29 and 30) to provide the "A" output. Fig. 33 represents the vectorial subtraction of vectors $C_1$ and $C_2$ to provide the resultant carrier output $C_A$. Fig. 34 represents the subtraction of vectors $U_1$ and $U_2$ to provide the resultant upper sideband output $U_A$. Fig. 35 represents the subtraction of vectors $L_1$ and $L_2$ to provide the resultant lower sideband output $L_A$.

Figure 36:
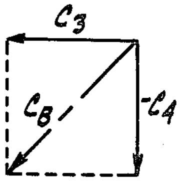
Figure 37:
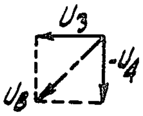
Figure 38:
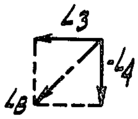

Figs. 36–38 represent the vectorial subtraction of the outputs of modulators 3 and 4 (Figs. 31 and 32) to provide the "B" output. Fig. 36 represents the subtraction of vectors $C_3$ and $C_4$ to provide the resultant carrier output $C_B$. Fig. 37 represents the subtraction of vectors $U_3$ and $U_4$ to provide the resultant upper sideband output $U_B$, while Fig. 38 represents the subtraction of vectors $L_3$ and $L_4$ to provide the resultant lower sideband output $L_B$.

Figures 39, 40, 41:
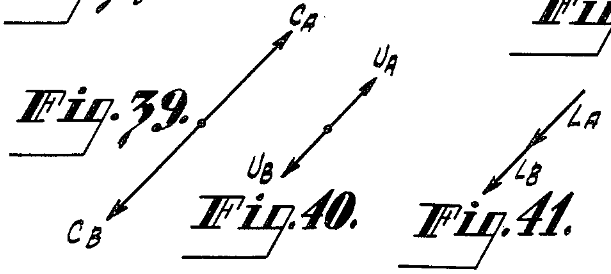

Figs. 39–41 represent the additive combination, $E_A+E_B$, of the "A" and "B" outputs. Fig. 39 represents the additive combination, $C_A+C_B$, of the carriers $C_A$ and $C_B$. It may be seen that the two carrier vectors $C_A$ and $C_B$ are equal and opposite, so that the carrier is cancelled out or suppressed at the output of combiner 27. Fig. 40 represents the additive combination, $U_A+U_B$, of the upper sideband vectors $U_A$ and $U_B$ applied to combiner 27. It may be seen that the two upper sideband vectors $U_A$ and $U_B$ are equal and opposite, so that the upper sideband is cancelled out or suppressed at the output of combiner 27. Fig. 41 represents the additive combination, $L_A+L_B$, of the lower sideband vectors $L_A$ and $L_B$ applied to combiner 27. It may be seen that the lower sideband is reinforced or augmented and appears at the output 25 of combiner 27, since vectors $L_A$ and $L_B$ extend in the same direction. Thus, for the particular connections in Fig. 28 and the phase relations represented in Figs. 29–32, the carrier and upper sideband are cancelled at the output of combiner 27 (the system output), while the lower sideband is reinforced and transmitted. Perfect cancellation of the undesired sideband results, since all of the *m*'s are assumed to be equal.

If the "A" output and the "B" output are combined subtractively, rather than additively as described, a somewhat different action takes place. In this case, the directions of the vectors $C_B$, $U_B$ and $L_B$ in Figs. 39–41 would all be reversed. Then, the carrier would not be cancelled at the system output, but instead would appear thereat in augmented or amplified fashion. The lower sideband would be cancelled at the system output, while the upper sideband would appear thereat in augmented form. Thus, the carrier and the upper sideband would be transmitted, while the lower sideband would be suppressed. Insofar as the arrangement of Fig. 28 is concerned, the additive combination of the "A" and "B" outputs (as in Figs. 39–41, by means of which the carrier is suppressed) is preferred, since in single sideband work it is ordinarily not desired to transmit the carrier.

Figure 29:
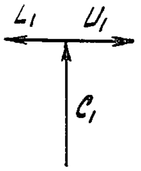
Figs. 29–41 are vector diagrams useful in explaining the operation of Fig. 28.
Figure 30:
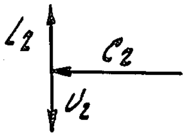
Figure 31:
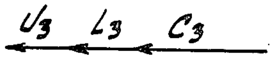
Figure 32:
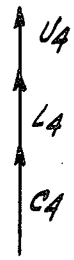

Reference has previously been made to the reversing switch 26 in Fig. 28, as being a sideband selector. This action will now be explained. If the selector switch 26 is thrown in the direction opposite to that previously assumed (that is, if it is thrown in a direction such that lead 13 goes to modulator 1 and lead 12 to modulator 2), the modulating voltages to modulators 1 and 2 are reversed in phase as compared to those for Figs. 29 and 30, and the "U" and "L" vectors are correspondingly reversed. That is to say, the directions of vectors $U_1$ and $L_1$ in Fig. 29 are interchanged, while the directions of vectors $U_2$ and $L_2$ in Fig. 30 are also interchanged. Since $U_1$ would now point to the left and $-U_2$ would now point downwardly, the direction of $U_A$ would be reversed as compared to Fig. 34. Since $L_1$ would now point to the right and $-L_2$ would now point upwardly, the direction of $L_A$ would be reversed as compared to Fig. 35. Then, when the "A" and "B" outputs are additively combined as in Figs. 39–41, since the directions of $U_A$ and $L_A$ are reversed, the carrier and lower sideband are now cancelled at the output of combiner 27 (the system output), while the upper sideband is reinforced and transmitted. This compares with the suppression of the carrier and upper sideband, and transmission of the lower sideband, in Figs. 39–41. Thus, by changing the position of the reversing switch 26 in Fig. 28, either the upper or the lower sideband may be selectively caused to appear at the output of the system.

Figure 42:
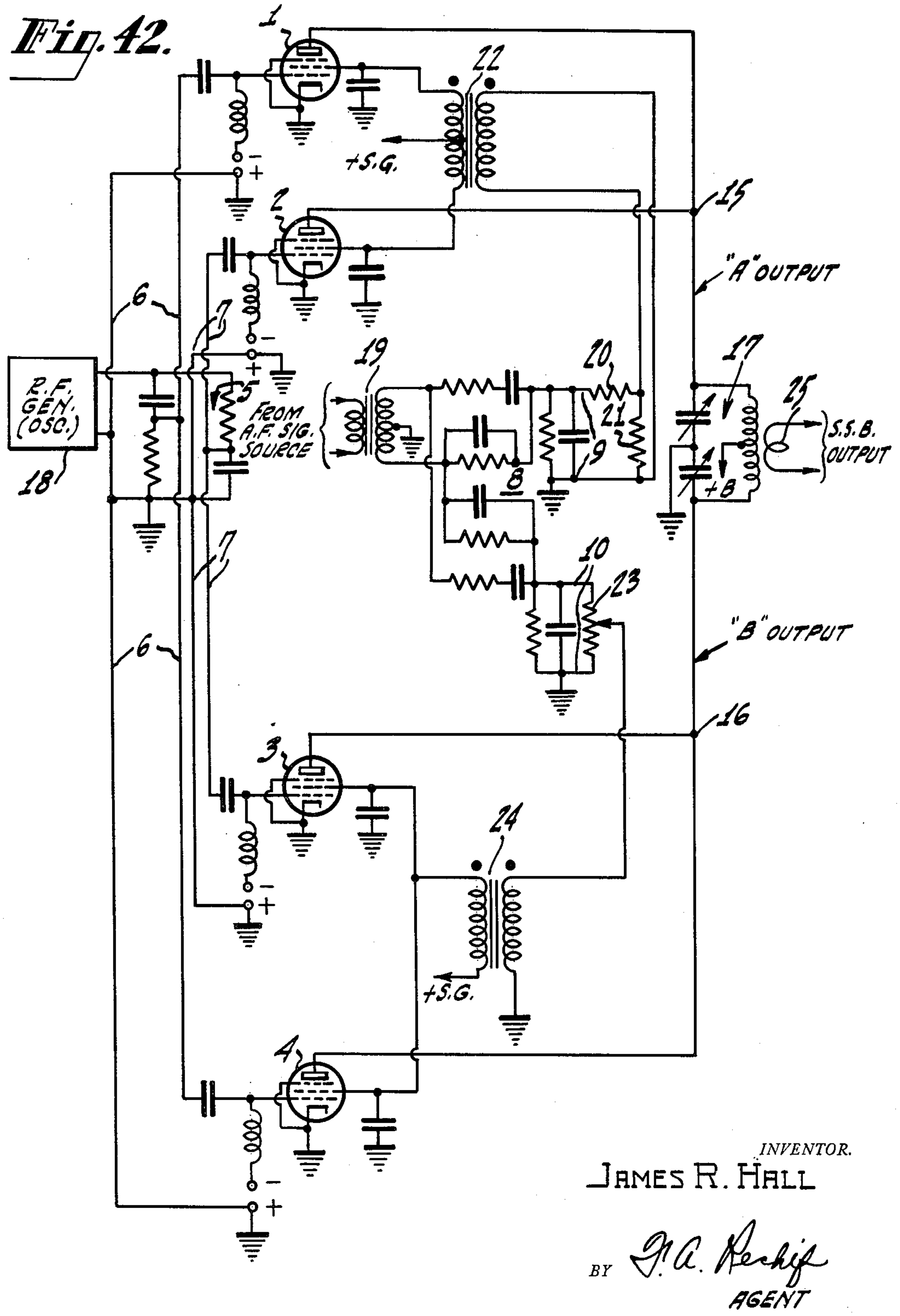
Fig. 42 is a detailed circuit diagram of a typical single sideband generator according to the arrangement of Fig. 1.

Fig. 42 is a detailed circuit diagram of a typical system according to the Fig. 1 embodiment. An R. F. generator 18, for example an oscillator, feeds R. F. or carrier energy into the R. F. phase shifter 5, which may be of the RC type as illustrated. Output leads 6 are connected to one output terminal of network 5 and feed R. F. energy of one phase through respective coupling capacitors to the control grids of pentode modulators 1 and 4. Output leads 7 are connected to the other output terminal of network 5 and feed approximately 90° phase displaced R. F. energy through respective coupling capacitors to the control grids of pentode modulators 2 and 3. Modulators 1, 2, 3 and 4 are all pentodes, connected to be screen grid modulated by the audio frequency modulating signal.

The audio frequency signal source feeds audio frequency modulating signals through a transformer 19 to an audio frequency phase shifter or phase shift network 8 which is illustrated as being of the type described in an article by R. B. Dome entitled "Wideband phase shift networks," Electronics, December 1946, pp. 112–115. A voltage divider, consisting of two resistors 20 and 21 in series, is connected across output leads 9 of shifter 8 (which leads supply a modulating voltage of zero phase) and a portion of the voltage across these resistors is fed to a push-pull transformer 22 opposite ends of the secondary of which are coupled to the screen grids of the respective tubes 1 and 2. Phase inversion is accomplished by the transformer 22, so that this transformer can be though of as corresponding to phase inverter 11 in Fig. 1. In this way, push-pull or antiphasal audio modulating voltages are supplied to modulators 1 and 2, and by the process known as screen grid modulation, amplitude modulation of the carrier is effected in tubes 1 and 2.

A potentiometer 23 is connected across output leads 10 of phase shifter 8, which leads supply a modulating voltage 90° displaced in phase with respect to that on leads 9. The movable tap on potentiometer 23 supplies a selected portion of the voltage across such potentiometer to a transformer 24. The potentiometer 23 serves as the variable gain device 14 for varying the audio frequency modulating voltage supplied to transformer 24 and modulators 3 and 4. This potentiometer 23, due to the fact that a voltage divider 20, 21 is used in the other output channel of network 8, enables the modulating voltage fed to modulators 3 and 4 to be made equal to, less than, or greater than, the modulating voltage fed to modulators 1 and 2. In this way, as previously described, the undesired sideband may be suppressed to the extent required even though the R. F. phase difference between the voltages on leads 6 and 7 varies considerably from 90°.

The screen grids of modulator tubes 3 and 4 are connected in parallel to the secondary of transformer 24. In this way, cophasal audio modulating voltages are supplied to modulators 3 and 4, and by the process known as screen grid modulation, amplitude modulation of the carrier is effected in tubes 3 and 4. The modulating voltage fed to tubes 3 and 4 is 90° out of phase with those fed to the two tubes 1 and 2.

The anodes of modulator tubes 1 and 2 are connected to a common point 15, at which the outputs of modulators 1 and 2 are added together or additively combined to provide the "A" output. Likewise, the anodes of modulator tubes 3 and 4 are connected to a common point 16, at which the outputs of these modulators 3 and 4 are added together or additively combined to provide the "B" output. Finally, the "A" and "B" outputs are applied to opposite ends of a push-pull-connected tank circuit, which serves as the subtractive combiner 17 and by means of which the "A" and "B" outputs are subtractively combined. As illustrated, the tank circuit 17 may include a coil across which are connected in series a pair of capacitors, the common junction of the two capacitors being grounded. By means of a winding 25 inductively coupled to the coil of tank circuit 17, the single sideband output of the system is abstracted for utilization.

As previously described, the voltage appearing in winding 25 consists of a single sideband, carrier-suppressed wave. As previously described, in some instances by appropriate connection of the respective output leads of the phase shifter 8 to the voltage divider 20, 21 and to the potentiometer 23, the desired sideband (either the upper sideband or the lower sideband) may be caused to appear at the system output winding 25, while suppressing the undesired sideband as well as the carrier. In other instances, the desired sideband may be selected by reversing the modulating signals into modulators 1 and 2.

Since with the system of this invention the undesired sideband may be suppressed to the extent desired, even though the phase difference between the two R. F. inputs may vary considerably from 90°, there is no particular necessity for measurement of the phase shift of the R. F. phase shifter or phase shift network 5. Thus, difficulties arising in such measurements are entirely obviated.

What is claimed is:

1. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, and means for combining the outputs of the two modulators constituting said second pair.

2. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, means for combining the outputs of the two modulators constituting said second pair, and means for subtractively combining the resultant output of the first pair of modulators and the resultant output of the second pair of modulators.

3. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, means for combining the outputs of the two modulators constituting said second pair, and means for additively combining the resultant output of the first pair of modulators and the resultant output of the second pair of modulators.

4. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, and means for combining the outputs of the two modulators constituting said second pair.

5. In a single sideband transmitter, four modulators arranged in first and second pairs, means for applying a modulating wave antiphasally to the two modulators of said first pair, means including a variable gain amplifier for applying the modulating wave cophasally to the two modulators of said second pair, whereby the amplitude of the modulating wave applied to said last-named modulators can be varied, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, and means for combining the outputs of the two modulators constituting said second pair.

6. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for additively combining the outputs of the two modulators constituting said first pair, and means for additively combining the outputs of the two modulators constituting said second pair.

7. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for subtractively combining the outputs of the two modulators constituting said first pair, and means for subtractively combining the outputs of the two modulators constituting said second pair.

8. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for additively combining the outputs of the two modulators constituting said first pair, means for additively combining the outputs of the two modulators constituting said second pair, and means for subtractively combining the resultant output of the first pair of modulators and the resultant output of the second pair of modulators.

9. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase to only the other modulator of each of said pairs, whereby the carrier wave energy applied to one modulator of each of said pairs is out of phase with the carrier wave energy applied to the other modulator of the same pair, means for subtractively combining the outputs of the two modulators constituting said first pair, means for subtractively combining the outputs of the two modulators constituting said second pair, and means for additively combining the resultant output of the first pair of modulators and the resultant output of the second pair of modulators.

10. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, means for combining the outputs of the two modulators constituting said second pair, and means for subtractively combining the resultant output of the first pair of modulators and the resultant output of the second pair of modulators.

11. In a single sideband transmitter, four modulators arranged in first and second pairs, means for applying a modulating wave antiphasally to the two modulators of said first pair, means including a variable gain amplifier for applying the modulating wave cophasally to the two modulators of said second pair, whereby the amplitude of the modulating wave applied to said last-named modulators can be varied, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, and means for combining the outputs of the two modulators constituting said second pair.

12. In a single sideband transmitter, four modulators arranged in first and second pairs, means for applying a modulating wave antiphasally to the two modulators of said first pair, means including a variable gain amplifier for applying the modulating wave cophasally to the two modulators of said second pair, whereby the amplitude of the modulating wave applied to said last-named modulators can be varied, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, means for combining the outputs of the two modulators constituting said second pair, and means for subtractively combining the resultant output of the first pair of modulators and the resultant output of the second pair of modulators.

13. In a single sideband transmitter, four modulators arranged in first and second pairs, means for applying a modulating wave antiphasally to the two modulators of said first pair, means including a variable gain amplifier for applying the modulating wave cophasally to the two modulators of said second pair, whereby the amplitude of the modulating wave applied to said last-named modulators can be varied, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for combining the outputs of the two modulators constituting said first pair, means for combining the outputs of the two modulators constituting said second pair, and means for additively combining the resultant output of the first pair of modulators and the resultant output of the second pair of modulators.

14. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for additively combining the outputs of the two modulators constituting said first pair, means for additively combining the outputs of the two modulators constituting said second pair, and means for subtractively combining the resultant output of the first pair of modulators and the resultant output of the second pair of modulators.

15. In a single sideband transmitter, four modulators arranged in first and second pairs, means for applying a modulating wave antiphasally to the two modulators of said first pair, means for applying the modulating wave cophasally to the two modulators of said second pair, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for subtractively combining the outputs of the two modulators constituting said first pair, means for subtractively combining the outputs of the two modulators constituting said second pair, and means for additively combining the resultant output of the first pair of modulators and the resultant output of the second pair of modulators.

16. In a single sideband transmitter, four modulators arranged in first and second pairs, means for applying a modulating wave antiphasally to the two modulators of said first pair, means including a variable gain amplifier for applying the modulating wave cophasally to the two modulators of said second pair, whereby the amplitude of the modulating wave applied to said last-named modulators can be varied, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for additively combining the outputs of the two modulators constituting said first pair, means for additively combining the outputs of the two modulators constituting said second pair, and means for subtractively combining the resultant output of the first pair of modulators and the resultant output of the second pair of modulators.

17. In a single sideband transmitter, four modulators arranged in first and second pairs, means for applying a moduating wave antiphasally to the two modulators of said first pair, means including a variable gain amplifier for applying the modulating wave cophasally to the two modulators of said second pair, whereby the amplitude of the modulating wave applied to said last-named modulators can be varied, the modulating wave applied to the modulators of said second pair being in phase quadrature with the modulating waves applied to the modulators of said first pair, means for applying a carrier wave of reference phase to only one modulator of each of said pairs, means for applying the same carrier wave but shifted in phase by an amount in the vicinity of ninety electrical degrees, to only the other modulator of each of said pairs, whereby the carrier wave energy applied to one modulator of each of said pairs is out of phase with the carrier wave energy applied to the other modulator of the same pair, means for subtractively combining the outputs of the two modulators constituting said first pair, means for subtractively combining the outputs of the two modulators constituting said second pair, and means for additively combining the resultant output of the first pair of modulators and the resultant ouput of the second pair of modulators.

References Cited in the file of this patent

UNITED STATES PATENTS

| | | |
|---|---|---|
| 1,744,044 | Green | Jan. 21, 1930 |
| 1,773,116 | Potter | Aug. 19, 1930 |
| 2,210,968 | Wirkler | Aug. 13, 1940 |
| 2,535,340 | Yost | Dec. 26, 1950 |
| 2,576,429 | Villard | Nov. 27, 1951 |
| 2,659,050 | Honey | Nov. 10, 1953 |